United States Patent [19]
Hansard

[11] Patent Number: 5,252,071
[45] Date of Patent: Oct. 12, 1993

[54] CUSTOM DRAPERY DESIGN SYSTEM

[75] Inventor: Rochelle T. Hansard, 2924 S. Cherokee La., Woodstock, Ga. 30188

[73] Assignee: Rochelle T. Hansard, Woodstock, Ga.

[21] Appl. No.: 17,768

[22] Filed: Feb. 16, 1993

[51] Int. Cl.$^5$ ............................................. G09B 25/00
[52] U.S. Cl. ........................................ 434/75; 40/594; 434/79; 434/72
[58] Field of Search ...................... 40/594; 434/72, 73, 434/75, 89, 80

[56] References Cited

U.S. PATENT DOCUMENTS

| | | | |
|---|---|---|---|
| 2,155,924 | 4/1939 | Barrett et al. | 434/79 |
| 3,135,058 | 6/1964 | Haas et al. | 434/75 |
| 4,121,358 | 10/1978 | Kistner | 434/75 |
| 4,330,951 | 5/1982 | Hauer | 434/72 X |
| 4,806,102 | 2/1989 | Pederson et al. | 434/80 |
| 4,991,333 | 2/1991 | McLean et al. | 40/534 |
| 5,015,190 | 5/1991 | Fowlkes, Jr. | 434/80 X |

FOREIGN PATENT DOCUMENTS

220398 3/1962 Austria ................................. 434/72
2608696 9/1977 Fed. Rep. of Germany ........ 434/80

Primary Examiner—Gene Mancene
Assistant Examiner—L. Thomas

[57] ABSTRACT

A custom drapery design system is a miniature two-dimensional graphic demonstration device and teaching aid. The system includes a wall display board made of heavy board stock and laminated on front and rear surfaces with a thin plastic coating. This wall display board has graphic indicia imprinted on front surface indicating variable ceiling heights and a static floor level. To achieve the purpose of this invention, window images made of white static cling vinyl of varying shapes and sizes indicative of windows most commonly used in homes, offices and other locations, are to be selectively arranged at the appropriate height on the wall display board. The window image or images are to be addressed with drapery components of varying shapes and all manner of design which are also made of white static cling vinyl. Such application allows designer/teacher to selectively arrange an many components desire to represent a window treatment. Layering the drapery components onto the window image presents the user with the ultimate flexibility of creating a virtually infinite variety of drapery designs.

6 Claims, 7 Drawing Sheets

CUSTOM DRAPERY DESIGN SYSTEM

BACKGROUND

1. Field of Invention

This invention relates to custom drapery design methodology. More particularly, this invention relates to improvements in method of presentation using miniature scaled window images and drapery components which will facilitate the demonstration in plurality of conceptual custom drapery designing.

2. Description of Prior Art

Custom drapery treatments suggest that they are designed and fabricated especially for the clients home, office or other space, reflecting the purchasers own style while meeting his or her needs quite individually. This means many times that the window treatment is an original design. The increasingly difficult task that confronts the interior designer today is the complexity of window fashions. Thus, the client to whom the interior designer is attempting to impart ideas for window designs is not for the most part accustomed to the terminology nor can they visualize many times what the designer is conveying even with the aid of examples:

Presently, there exist many ways to introduce drapery designs to the client and listed below are some of the most frequently used examples:

1. Rough sketch by the designer.
2. Encyclopedia of window glossaries, catalogs or magazines.
3. A professional designer proficiently producing color renderings.
4. Designer's portfolio
5. Word pictures verbalized, which can not actually be shown to the client.

It is known that there are many ways to display items of interest to an audience. Some are made of cork and items to be displayed thereon are secured by positive mechanical fasteners such as pins and thumbtacks, etc. Flannel boards are another source to display multiple items as well as magnetic display boards whereon the items of interest can be magnetically positioned and easily moved around on the work surface.

While it is generally known that there are many products in the market place today made of the materials used in the structural make-up of this invention, it has not become known to me that there is or has ever been a miniature custom drapery design system in existance. This design approach is achieved by demonstrating in a multiple layering process resulting in a two dimensional progressive conceptual pictorial design method using static cling vinyl for the design medium.

Objects and Advantages

Therefore, it is a general object of this invention to provide an apparatus which overcomes the aforementioned inadequacies and provide an improvement which is a significant contribution to the advancement of design procedures for the interior designer and/or teacher.

The invention discloses a flexible custom drapery design system in miniature form to be used as a selling tool by the interior designer and for interior design schools to use as a teaching and learning tool in the art of drapery design in relation to a given space.

An important object of this invention is the provision of a system which can easily be used by the novice designer as well as a professional designer or interior design school teacher.

Another object of the present invention to eliminate the trouble and expense of drafting and redrafting preliminary designs.

Another object of this invention to provide a drapery design system which is of simple and economical construction.

Another object of this invention is to have total versatility with entire design system. All drapery components regardless of shape or size or item has been artistically drawn to perfect scale enabling each drapery component to interact with any other drapery component or window image in the system. This flexibility gives the designer/teacher total freedom for originality and using their design ability, will be able to create any type of window fashion imaginable.

Another object of this invention to provide a drapery design system which is light weight and compact which offers a multitude of design options which are switchable.

Another object of this invention is provision of a method of drapery designing which entails a novel use of existing inexpensive technology.

Another object of this invention is the ability to supplement the design system with additional window images and drapery components as window fashions change.

Another object of this invention is to offer a complete scaled process by which a consumer will have a clear and concise pictorial image of drapery designs constructed from the custom drapery design system.

The foregoing has outlined some of the more pertinent objects of this invention. These objects should be construed to be merely illustrative of some of the more prominent features and applications of the intended invention. Accordingly, other objects and a fuller understanding of the invention may be had by referring to the summary of the invention and the detailed description describing the preferred embodiment in addition to the scope of the invention defined by the claims taken in conjunction with the accompanying drawings.

It is also to be understood that the following claims are intended to cover all of the generic and specific features of the invention herein described and all statements of the scope of the invention which as a matter of language might be said to fall therebetween.

Drawing Figures

REFERENCE NUMERALS IN DRAWINGS

| |
|---|
| 12 board stock substrate |
| 14 laminated |
| 16 front surface |
| 18 rear surface |
| 20 window image |
| 22 drapery component |
| 24 wall display board |
| 26 colored storage sheets |
| 28 horizonal lines |
| 30 double horizonal lines |
| 32 three hole punched |
| 34 scored in center |
| 36 indicia detailed representation |
| 38 die cut |
| 40 discrete number |
| 42 page number |
| 44 white supply sheet |
| 46 manufacturers substrate |
| 48 static cling vinyl - polyvinyl chloride |

Description-FIGS. 1-6

Figure 1:
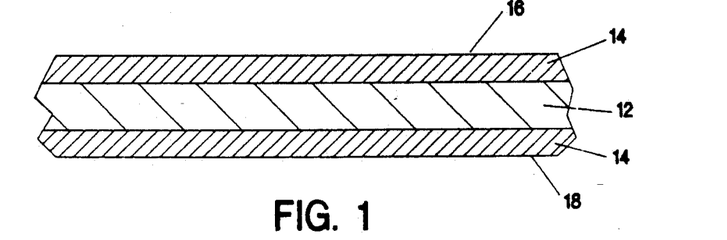
FIG. 1 shows an enlarged fragmentary view in vertical section of the wall display board laminated front and rear.

A typical embodiment of a custom drapery design system of the present invention is illustrated in FIG. 1 wherein a system comprising a unitary flexible relatively thick board stock substrate 12 and is laminated 14 on front surface 16 as well as rear surface 18 with a thin plastic film 14 which is smooth and non-porous. The drawing depicts a fragmentary vertical view of the above described composition of a wall display board 24.

Figure 2:
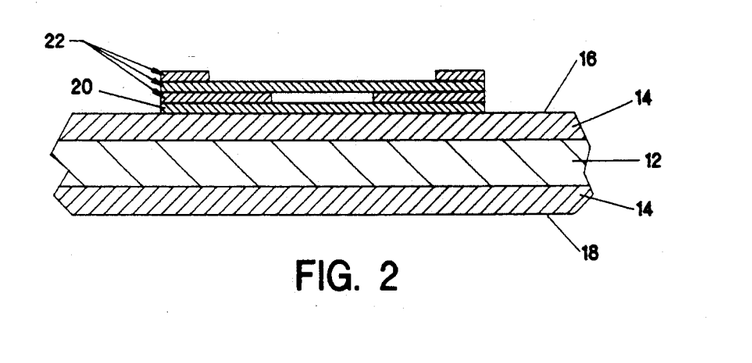
FIG. 2 shows an enlarged fragmentary view in vertical section of the wall display board with the application of a window image and drapery components in multiple layering, one on top of the other, self-adhered to the surface of wall display board which has been laminated front and rear.

Referring to FIG. 2 also depicts a fragmentary vertical view of a wall display board 24 with multiple application of window image 20 and drapery components 22 made of polyvinyl chloride 48 and is inherently static cling and will self-adher to smooth non-porous surface of the wall display board 24 or to one another when applying one component on top of another component with only slight finger pressure to fix thereon.

Figure 3:
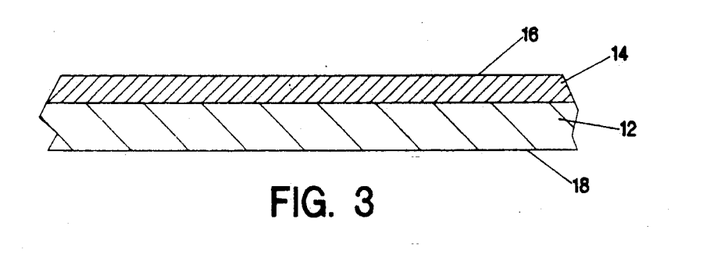
FIG. 3 shows an enlarged fragmentary view in vertical section of the colored storage sheet with a laminated front surface.
Figure 4:
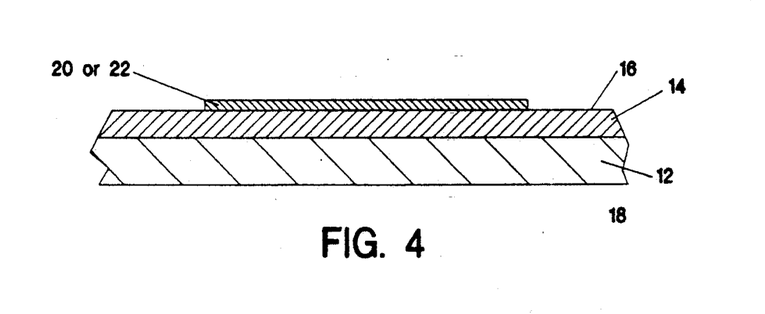
FIG. 4 shows an enlarged fragmentary view in vertical section of the colored storage sheet with laminated front surface with a window image or drapery component adhered electrostatically to the surface.

Referring to FIGS. 3 and 4 depicts a fragmentary view in vertical section of the composition of a colored storage sheet 26 which serves as an important factor in the make-up and the success of this invention. System comprises of as many colored storage sheets 26 as necessary to accommodate all of the window images 20 and successive additions in the future and all drapery components 22 and successive additions in the future. Colored storage sheets 26 are constructed of a relatively thick flexible board stock substrate 12 which has been laminated 14 with a plastic coating on front surface 16 only which is smooth and non-porous. The drawing depicts a vertical view of a colored storage sheet 26 with a window image 20 and drapery component 22 made of white static cling vinyl 48 electrostatically adherred to front surface 16.

Figure 5:
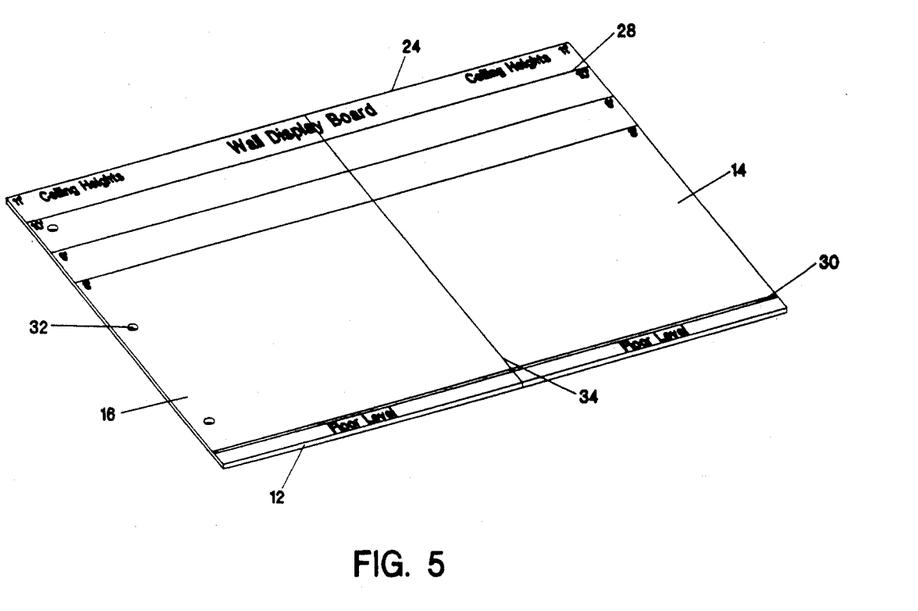
FIGS. 5 and 6 shows a perspective view of a foldable wall display board in accordance with the embodiment of the present invention, illustrated in its folded and unfolded condition.
Figure 6:
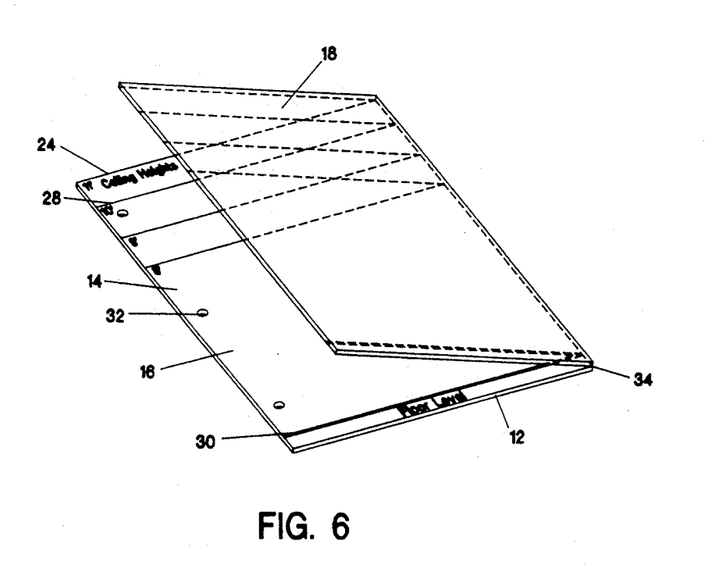

Referring to FIGS. 5 and 6 according to the invention comprises a unitary wall display board 24 which is a relatively thick board stock substrate 12 and has a thin plastic film laminated 14 on front surface 16 of board stock 12 as well as rear surface 18 of board stock 12 which is smooth and non-porous. The front view of the wall display board 24 has indicia imprinted on upper front surface 16 of horizontal lines 28 illustrating variable ceiling heights and double horizontal lines 30 at bottom of wall display board 24 illustrating static baseboard - floor level. The left side of wall display board 24 has been three hole punched 32 for placement in three ring binder and scored in center 34 which facilitates folding to reduce page width for insertion in three ring binder.

Operation-FIGS. 7-15

Figure 7:
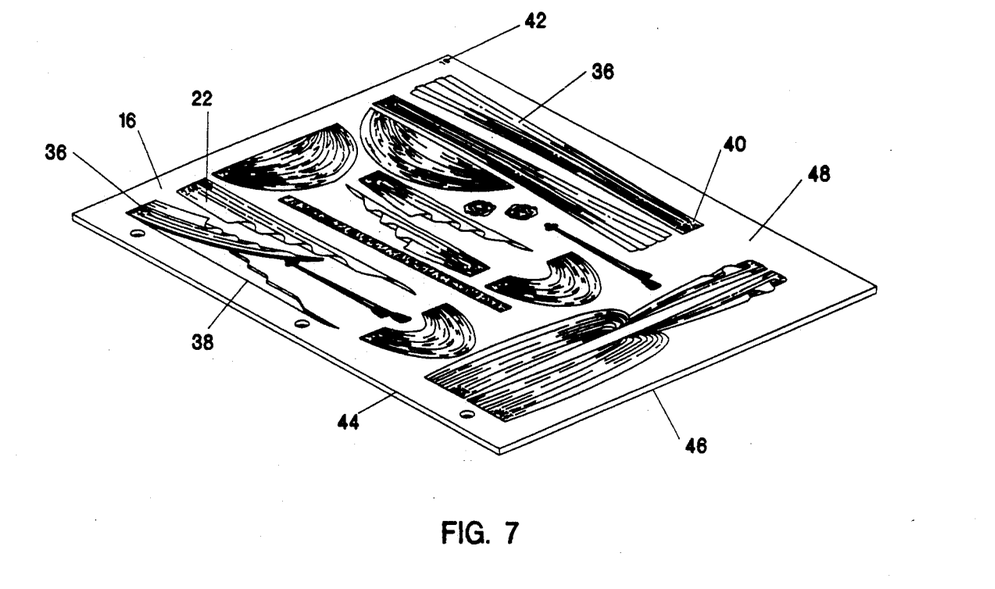
FIG. 7 shows a top plan view of a white supply sheet illustrating the removal of a drapery component.

Referring to FIG. 7 system includes white static cling vinyl 48 supply sheets 44 made of polyvinyl chloride 48 material and is attached to a relatively thin substrate 46 furnished by the manufacturer and serves as liner between layers of white static ling vinyl 48 for manageability during processing. In processing static cling vinyl 48 supply sheets 44 for this system the individual sheets are clear coated with acrylic for ink receptivity and has indicia 36 imprinted on front surface 16 illustrating in detailed representation 36 window images 20 and drapery components 22 included in this system. Each white static cling vinyl 48 supply sheet 44 also has indicia imprinted on surface illustrating numerical page 42 sequence. Each window image 20 and drapery component 22 has also been imprinted with their own subsequent discrete number 40. A plurality of individual window images 20 and drapery components 22 are formed when the perimeter of imprinted indicia 36 has been die cut 38 which facilitates the removal of window images 20 and drapery components 22. By manually removing all window images 20 and drapery components 22 from the surface of the supply sheet 44 and transferring all images 20 and components 22 in this manner to their discrete numerical 40 position on the front surface 16 of the colored storage sheets 26 completes the system assembly. Since the white static cling vinyl 48 does not have to be processed further the attached manufacturers backing substrate 46 and the static cling vinyl 48 surrounding the perimeter of the window images 20 and drapery components 22 is of no inherent value thus should be discarded.

Figure 8:
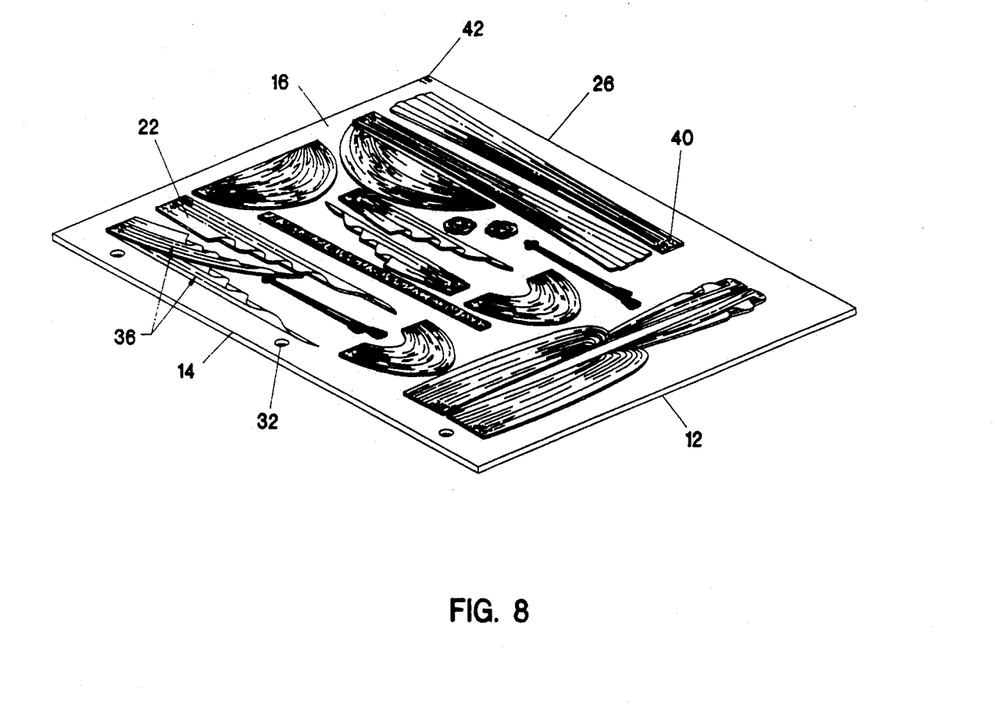
FIG. 8 shows a top plan view of the placement of a drapery component in its discrete numerically coded position on the colored storage sheet.

Referring to FIG. 8 system includes colored storage sheets 26 made of relatively thick board stock substrate 12 and is laminated 14 on front surface 16 with a thin film of plastic which is smooth and non-porous. The front view of colored storage sheets 26 has indicia imprinted 36 on surface identical to surface of static cling vinyl 48 supply sheets 44 illustrating numerical page sequence 42 and illustrations in detailed representation 36 of window images 20 and drapery components 22 by topical order. Each window image 20 and drapery component 22 has also been imprinted with their own subsequent discrete number 40 by which each image 20 and component 22 may be indexed and cross referenced for retrieval and replacement into system for storage. The left side of each storage sheet has been three hole punched for placement in three ring binder.

Figure 9:
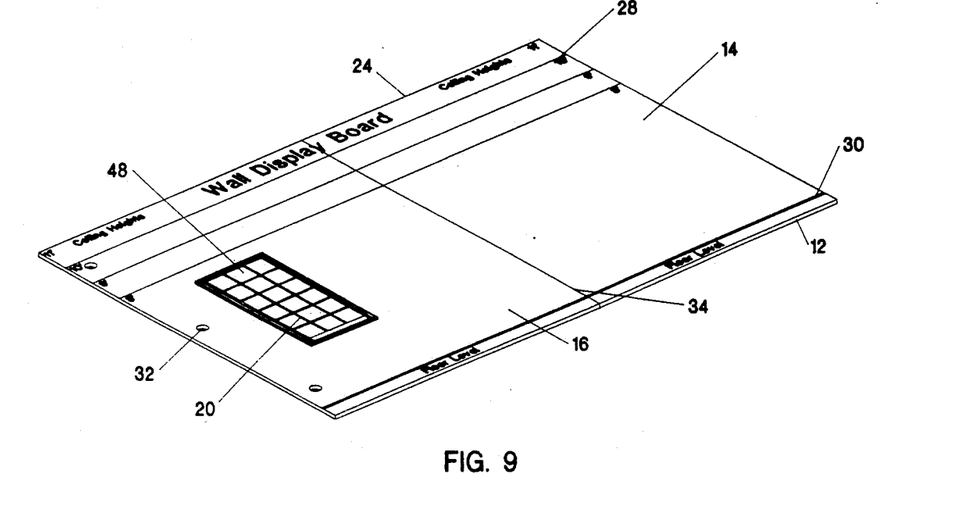
FIG. 9 shows a perspective view illustrating application of a white static cling vinyl window image electrostatically adherred to the front surface of the wall display board.

Referring to FIG. 9 system 10 includes window images 20 of varying shapes and sizes made of white static cling vinyl 48 material and is clear coated with acrylic for ink receptivity. Each white static cling vinyl 48 window image 20 is imprinted with indicia 36 illustrating detailed representation 36 which are die cut 38 around perimeter of indicia 36 and when in use can be electrostatically adherred to the non-porous surface of wall display board 24 or returned to their discrete storage location on the colored storage sheets 26. The surface of the window images 20 can be pressed slightly to cause self-adhesion sufficiently to fix the static cling vinyl 48 window image 20 on to wall display board 24 or storage sheet 26 surface. Each of the vinyl window images 20 has a discrete number 40 in sequential order and thus is imprinted on surface of each window image 20.

Figure 10:
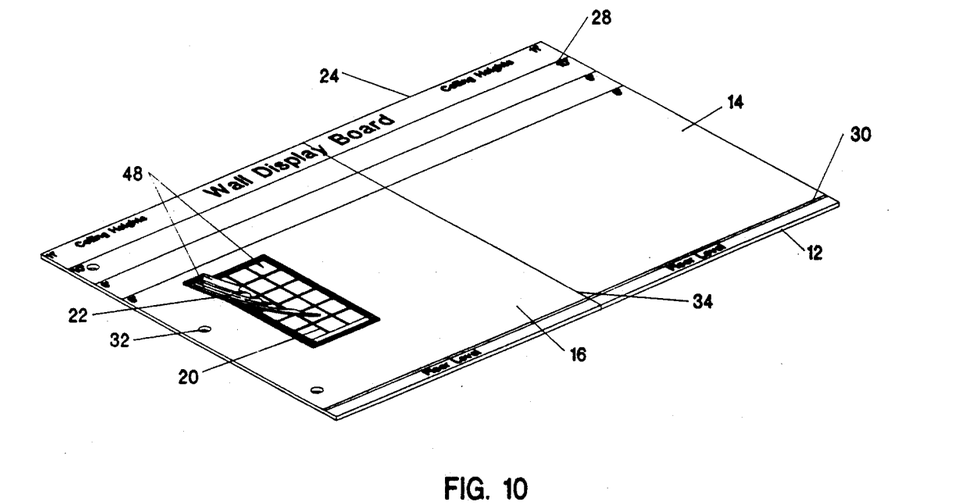
FIG. 10 shows a perspective view illustrating application of a white static cling vinyl drapery component being adherred to top surface of window image which has been electrostatically adherred to the front surface of the wall display board.

Referring to FIG. 10 shows application in progress of a drapery component 22 being positioned on top of a vinyl window image 20 which has been electrostatically adherred to front surface 16 of wall display board 24.

Figure 11:
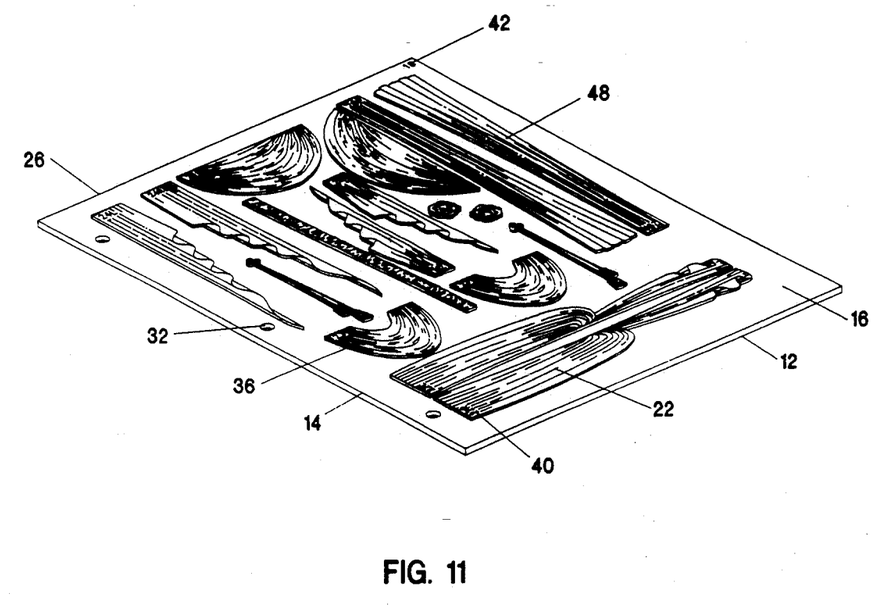
FIG. 11 shows a top plan view of a colored storage sheet illustrating numerical coding process for the window images, drapery components as well as page number.
Figure 12:
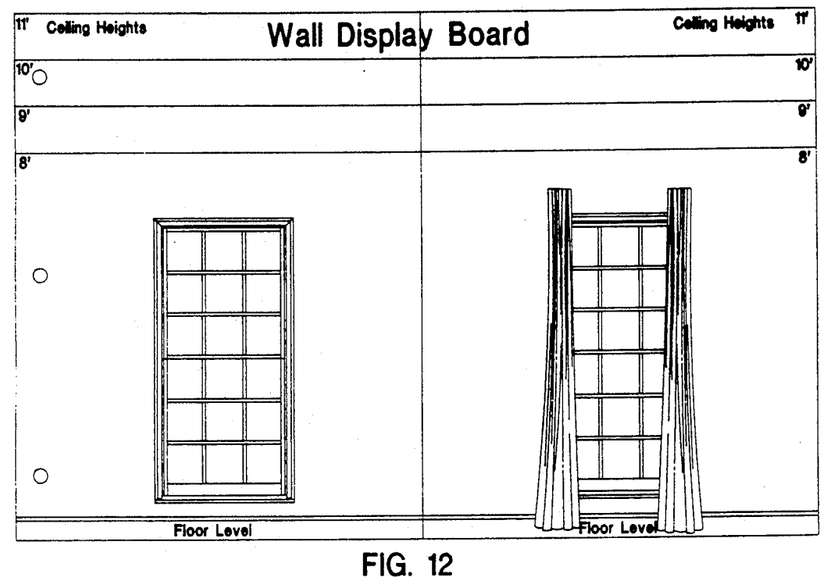
FIGS. 12, 13, 14, and 15 shows a perspective view illustrating the versatility of the drapery components and the ease with which a complete change can be effected by simply applying one component on top of another.
Figure 13:
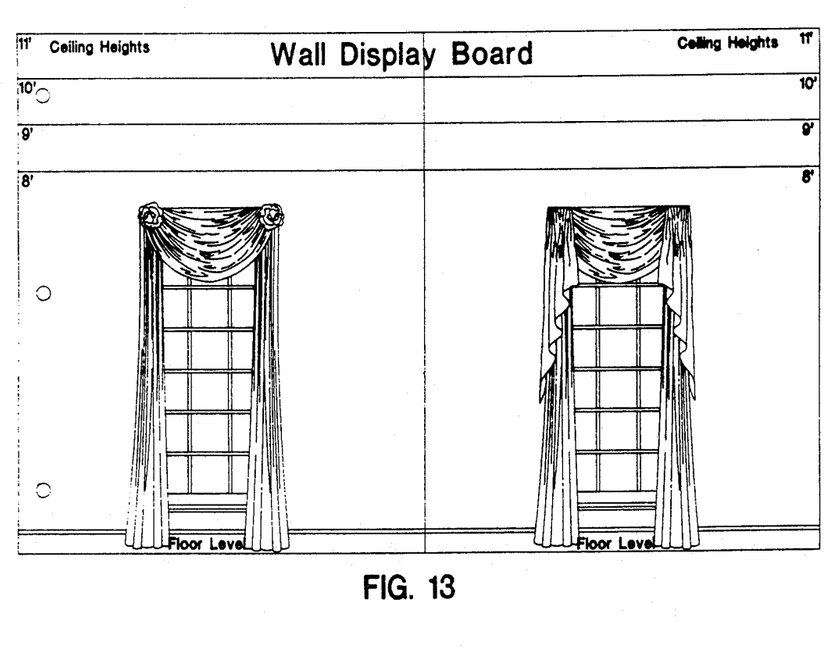
Figure 14:
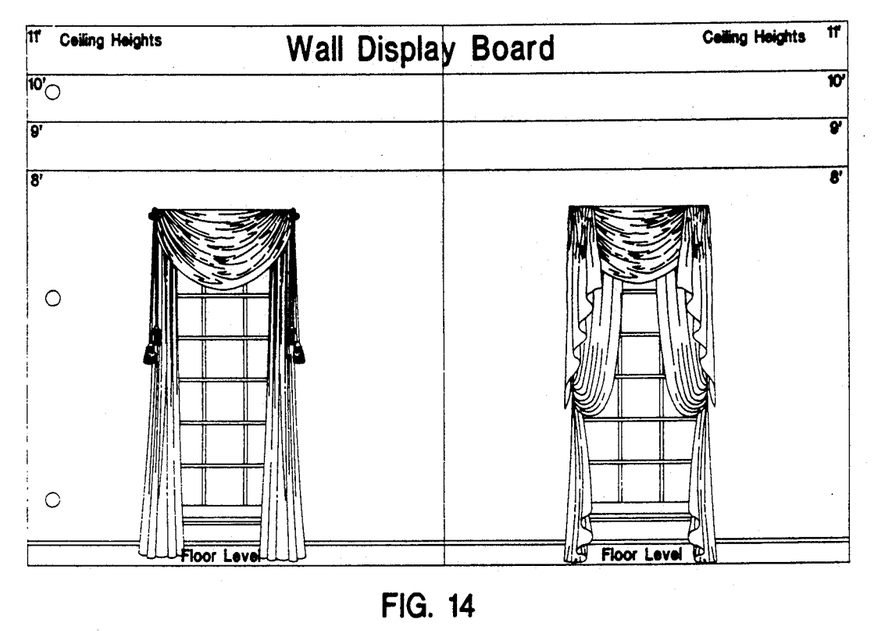
Figure 15:
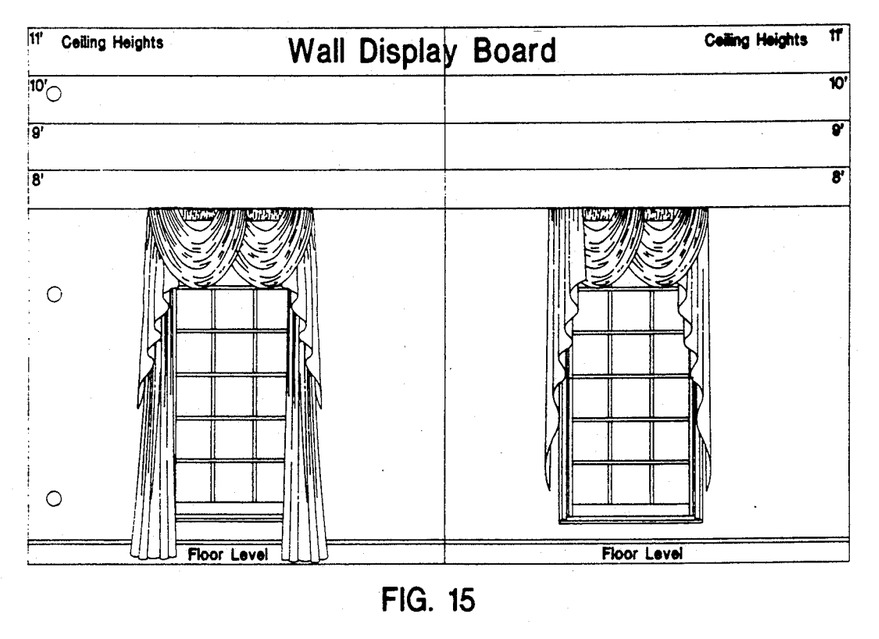

Referring to FIG. 11 reflects a colored storage sheet 26 with placement of white static cling vinyl 48 drapery components 22 in their discrete numerical 40 position. From top view of colored storage sheet 26 surface one can readily discern that each drapery component 22 is in similar likeness in appearance to an actual corresponding drapery panel, swag, cascade, rosette, tassel, etc. This colored storage sheet 26 has a discrete page number 42 as do all of the rest of the storage sheets 26 in this system, divided by topic and referenced by index listing all images 20 and components 22, their discrete number 40, dimensions, right or left when appropriate and quantity of each window image 20 and drapery component 22 included in this system. For example: page 18-item 28R&L-shirred cascade-4" wide×13" inside length×33" outside length-one each. The cross discrete numbers 40 of window images 20 and drapery components 22 and the page reference number 42 on which they are located in the storage system facilitating retrieval and replacement. This cross reference listing is separate and apart from the index listing. After using the images 20 and components 22 the cross reference listing makes replacement back into the system much faster and easier. The colored storage sheets 26 have been three hole punched 32 for placement in three ring binder.

Referring to FIGS. 12, 13, 14 and 15 reflects placement of window images 20 which are electrostatically adherred to front surface 16 of wall display board 24 and having selected several drapery components 22 from colored storage sheets 26, demonstrating in a multiple layering process of two dimensional progressive pictorial display reflecting with ease the different approaches one may make in determining a drapery design for a client.

While my above descriptions contain many specificities, these should not be construed as limitations on the scope of the invention, but rather as an exemplification of one preferred embodiment thereof.

I claim:

1. A device for demonstrating a custom drapery design comprising:

A display board having a front laminated surface and a back surface, said front surface imprinted with a plurality of first horizontal lines representing ceiling heights and a second horizontal line member representing a baseboard;

A plurality of window members configured and dimensional scaled to represent windows, said window members attachable by static electric attraction to said display board;

A plurality of drapery component members configured and dimensional scaled to represent drapery components, said drapery component members attachable by static electric attraction to said display board and said window members; and A plurality of colored storage sheets to which said window members and drapery components are attachable;

Wherein said window members and drapery components are indexed to a colored storage sheet.

2. The device of claim 1 wherein said second horizontal line member comprises a double horizontal line.

3. The device of claim 1 wherein said display board also comprises a scored line to allow the board to fold and said display board also defines apertures which allow the board to be inserted into a binder.

4. The device of claim 1 wherein said colored storage sheets further including indicia representing drapery component members imprinted thereon.

5. The device of claim 1 wherein the back side of the display board is laminated so that the window members and the drapery components may be attached to both sides of the display board.

6. The device of claim 1 wherein each colored storage sheets is coded and wherein the drapery components and window members to be placed on a colored storage sheet are coded similarly to said colored storage sheet to aid in the replacement of the window images and drapery components after use.

* * * * *